United States Patent Office 2,964,487
Patented Dec. 13, 1960

2,964,487

WAX EMULSION POLISH

Wilbur F. Chapman, Morris Township, Morris County, and John Pisanchyn, Morristown, N.J., assignors to Allied Chemical Corporation, a corporation of New York No Drawing. Filed Jan. 27, 1958, Ser. No. 711,158

4 Claims. (Cl. 260—23)

This invention relates to aqueous wax emulsion polishes, and more particularly to polishes of the "dry bright" type from which, upon application of the polish, the wax is deposited and, on drying, leaves a hard surface having a bright lustre.

In preparing such aqueous polishes in the past, it has been the practice to use emulsifiable, hard waxes, such as carnauba wax, dispersed in water with the aid of emulsifying agents such as higher fatty acids, e.g. oleic acid, in combination with an organic base such as an amine. To such polishes have sometimes been added emulsions of polymeric materials to impart special characteristics. To impart gloss and "leveling" characteristics, compatible natural resins or alkali-soluble synthetic resins have been blended with the wax. Upon evaporation of the water, the blended solids are deposited on the floor or other surface to which the polish is applied. In order to obtain a polish film of good water resistance, free from disintegration and spotting when contacted with aqueous liquids, volatile amines such as morpholine (B.P. 128° C. at 760 mm.) have customarily been used in polishes meeting high standards of water resistance. Such amines evaporate substantially completely from the polish solids, or are otherwise transformed so that the resulting film is not readily reemulsifiable and hence it becomes resistant to water. The non-volatile amines, on the other hand, when used with the commonly employed polish waxes such as carnauba and microcrystalline waxes in "dry-bright" polish compositions, produce films which are unduly water sensitive and subject to water-spotting. Triethanolamine, a relatively non-volatile amine (B.P. 360° C. at 760 mm.), although more advantageous economically than the volatile amines, has been superceded almost completely for use in polishes meeting high standards of water resistance. Compositions using the volatile amines, however, while highly water resistant, often prove extremely difficult to remove from the floor or other surface. Failure to remove the old polish coating prior to renewal of the polish surface results in uneven and unsightly build-up of polish solids on the surface, and has become a major disadvantage of such water-resistant polishes.

We have now found, that wax emulsion polishes of a high degree of water-resistance and freedom from water-spotting may be prepared having excellent removability of the dried film, and other desirable characteristics, according to our invention wherein a mixture of triethanolamine and a volatile amine in controlled relative proportions is used as the amine constituent of the emulsifying agent, in a composition comprising as the preponderant component of the wax solids portion, an emulsifiable, oxidized polyethylene wax more fully described hereinafter.

The polish composition of our invention comprises (1) an aqueous, oxidized polyethylene wax emulsion which may contain polyethylene wax as the only wax constituent of the polish, or it may contain minor quantities of other waxes such as carnauba and microcrystalline waxes. The polish composition may also contain substantial proportions of (2) emulsions or latices of polymers such as polystyrene, polyvinyl chloride and polyacrylic resins; (3) a solution of a compatible alkali-soluble resin such as rosin; phenolformaldehyde resins; maleic acid and fumaric acid condensation products of rosin; maleic anhydride and fumaric acid condensation products of polyhydric compounds; maleic anhydride and fumaric acid condensation products of rosin and polyhydric compounds; shellac or casein.

To secure the advantages of high water resistance in our composition, the proportion of oxidized polyethylene wax should comprise somewhat more than about 50% of the total solids content of the wax emulsion composition, and at least about 30% of the amine content should be a volatile amine.

To assure adequate "removability" of the film after drying, at least about 60% of the total amine content should be triethanolamine. The remainder may be a volatile amine or mixture of volatile amines.

Thus mixtures of between about 60% and 70% of triethanolamine with between 40% and 30% of a volatile amine are suitable for securing the advantages of high water resistance coupled with good removability of the polish after application.

By the term "volatile amine" is meant an aliphatic or hydroxy aliphatic amine having a boiling point below about 200° C. at 760 mm. pressure.

Suitable volatile organic amines for blending with the triethanolamine in emulsifying the emulsifiable oxidized polyethylene wax include the lower aliphatic and hydroxy aliphatic amines having boiling points at 760 mm. below about 200° C., for example morpholine, methoxypropylamine, 2-amino-2-methyl-1-propanol, ethanolamine, dimethyl ethanolamine, ethylene diamine etc. Of the above, morpholine and methoxypropylamine are preferred. Of the latter, methoxypropylamine is the more powerful emulsifying agent and its use permits reduction in the total amine content and corresponding reduction in the higher fatty acid.

Suitable higher fatty acids for forming the amine/fatty acid emulsifying agent include the saturated and unsaturated aliphatic acids having from 12 to 18 carbon atoms including oleic, linoleic, linolenic, lauric, palymitic, stearic etc.

Emulsifiable oxidized polyethylene waxes suitable for use in the compositions of our inventions are described in copending application Serial No. 515,770 of Michael Erchak, Jr., filed June 15, 1955, according to which normally solid, hard, waxy polymers of ethylene, which are saturated aliphatic compounds characterized by a recurring —$CH_2$— group and which have average molecular weights between about 1,000 and about 3,000, especially polyethylene/alkanol telomers of this character, are subjected, in the liquid phase, to the action of an oxygen-containing gas to cause reaction of at least about 5 pounds of oxygen per 100 pounds of wax, preferably between about 5 pounds and about 17 pounds of oxygen per 100 pounds of wax, i.e. to provide an oxidized polyethylene wax containing at least about 3%, preferably between about 3% and about 9% of oxygen by weight, based on the weight of the oxidized wax, and acid numbers of not more than about 50, preferably between about 10 and about 45. The oxidized polyethylene/isopropanol telomer waxes prepared according to the above method containing between about 3% and about 6% oxygen and having melting points between about 90° C. and about 110° C., acid numbers between about 10 and about 20, and zero ester numbers, are especially preferred.

Also suitable are the emulsifiable oxidized polyethylene waxes prepared as described in copending application Serial No. 524,620 of Wilbur F. Chapman and John N. Cosby, filed July 26, 1955, which involves subjecting the non-emulsifiable polyethylene wax to oxidation in a manner similar to that employed in the above Erchak process using a modification wherein the polyethylene wax in the liquid phase is subjected to the oxidation treatment after addition thereto of a small quantity of an unsaturated aliphatic carboxylic acid having from 4 to 6 carbon atoms and having at least 1 carbonyl group attached to the doubly bonded carbon atoms. Preferred unsaturated acids are maleic acid or anhydride and fumaric acid.

The waxy ethylene polymers which are oxidized as above described, may themselves be prepared by any suitable known methods, for example by subjecting ethylene, either alone, or in the presence of a co-reactant to temperatures between about 150° C. and about 300° C. and pressures ranging from about 500 p.s.i. to about 7,000 p.s.i. as disclosed in U.S. Patents 2,683,141 and 2,504,400 of Michael Erchak, Jr. Oxidation of the waxy polymers of ethylene may result in oxidized waxes having average molecular weights somewhat less than those of the original waxes. Accordingly, the oxidized polyethylene waxes used in our invention may have average molecular weights between about 1,000 and about 3,000, and toughness characteristics between about 2.0 and about 5.0 foot pounds per linear inch as measured by the Izod impact test (ASTM-256-47-T).

In preparing the polish compositions of our invention, each of the three basic components, oxidized polyethylene wax, polystyrene or equivalent resin, and alkali-soluble resin, is separately prepared in the form of an aqueous emulsion or solution and the emulsions and solution are then blended in proportions such as to provide concentrations of said three components in the final emulsion lying within the indicated ranges.

For simplicity of preparation, each of said three components is prepared in the form of an emulsion or solution containing 8% to 20%, preferably about 15%, by weight of solids. If desired, emulsions and solutions containing higher and lower concentrations of components can be employed. Thus, commercial polystyrene emulsions containing 36% or more solids can be used as such, and suitable adjustment can be made by the use of other components of lower concentration or by addition of water.

The preferred proportions of the above three basic components are 20% to 55% by weight of the wax emulsion containing 8% to 20% of oxidized polyethylene wax, 20% to 55% by weight of polystyrene or equivalent emulsion containing 8% to 20% by weight of polystyrene, and 20% to 45% by weight of a solution of alkali-soluble resin containing 8% to 20% by weight of resin, all combined into a stable aqueous dispersion containing 8 to 20 parts total solids per 100 parts by weight of dispersion.

Polishing compositions of outstanding properties contain the components in the preferred ranges of proportions set out above. Beyond said ranges, compositions varying from said preferred ranges are also valuable polishes but they vary with respect to one or more properties depending upon the component varied. Thus, increasing the amount of oxidized polyethylene wax increases the buffability, non-slip and flexibility of the composition but also increases its tendency to pick up dirt and become tacky.

Increasing the proportion of polystyrene resin increases the hardness and brittleness of the resulting coating but decreases the spreading and leveling properties. On the other hand, when the amount of polystyrene resin is substantially decreased, the coating becomes softer and less scuff resistant.

Substantial increase of the alkali-soluble resin tends to render the resulting emulsion less stable and causes the coating to become brittle and less wear resistant. On the other hand, greatly decreased amounts of the alkali-soluble resin lead to poor spreading and leveling and softer wax coatings.

For preparation of the wax component emulsion, the oxidized polyethylene wax is emulsified with the fatty acid mixed amine emulsifying agent by melting the oxidized polyethylene wax, with care not to exceed a temperature of about 135° C. and adding the fatty acid such as oleic acid. With the melt temperature at 120° to 130° C. the mixed amines are added slowly. The water is heated to 95° to 99° C. (just below boiling). While agitating, the hot melt at 115° to 125° C. is added gradually to the hot water in such a manner that the melt stream enters the water at the top of the vortex caused by the stirring action, spiralling down the vortex and being emulsified enroute without accumulation in the vortex. When all the melt has been added to the water, stirring is reduced and the emulsion is allowed to cool to 40° to 50° C. The emulsion is then weighed, and any weight loss due to evaporation of water, is compensated by addition of water to restore original weight. Thus 40 parts by weight of emulsifiable, oxidized polyethylene wax may be emulsified with 1 to 15 parts, preferably 3 to 9 parts, by weight of oleic acid, and 2 to 16 parts, preferably 3.5 to 10.5 parts by weight of mixed amines and sufficient water to bring the total solids to 8% to 20%. Higher proportions of wax can be used, with suitable adjustment of the other components and/or the final emulsion. Thus, the wax emulsions may contain up to 35% or more of the oxidized polyethylene wax.

As polystyrene resin component, various emulsions of high molecular weight polystyrene resins (those having a molecular weight above 5,000) and preferably those having a molecular weight above 100,000 may be employed. Those which are aqueous emulsions formed in the preparation of the polystyrene resin and which come into the market in highly dispersed emulsion form (latices) are preferred.

While the oxidized polyethylene wax exerts a plasticizing effect on the polystyrene resin, we prefer, in order to impart superior leveling and other desirable properties to the final emulsion composition, to incorporate a small amount of an additional plasticizer with the polystyrene emulsion; as, for example, an organic plasticizer such as a phthalate plasticizer (e.g., dibutyl phthalate), or an alkyl phosphate plasticizer (e.g., tributyl phosphate or tributoxy ethyl phosphate). Preferably a small amount of a mixture of a phthalate plasticizer and an alkyl phosphate plasticizer is employed, and particularly dibutyl phthalate and tributoxy ethyl phosphate.

In preparing the polystyrene resin emulsion component, the small amounts of plasticizer are mixed with the polystyrene resin, preferably as obtained in aqueous emulsion form, and then sufficient water is added to dilute the mixture to the desired solids concentration. Equivalent polymer emulsions may be prepared in similar manner.

Various synthetic and natural, alkali-soluble resins may be employed as the resin component of the composition, for example, phenol-formaldehyde resins, maleic anhydride and fumaric acid condensation products of rosin, and/or polyhydric compounds, rosin, shellac or casein. Preferably, the resin is a synthetic resin of the phenol-formaldehyde type.

In preparing the solution of the alkali-soluble resin, the resin is preferably dissolved by gentle heating in an aqueous solution of a suitable alkali. In general, ammonium hydroxide is preferred, since it is readily volatilized from the finished composition. It may be replaced, however, in part or in whole, by other alkalis; as, for example, borax or one of the above organic bases.

The three components in the emulsion or solution form can be blended in any order in the proportions adapted to provide the proportions of components set out herein.

The final aqueous emulsion polishes of our invention preferably contain between 8 to 20 parts total solids per 100 parts by weight of dispersion, such solids comprising essentially 1.6 to 11 parts of wax, preponderantly oxidized polyethylene wax, 1.6 to 11 parts by weight of polystyrene or equivalent resin, and 1.6 to 9 parts of alkali-soluble resin. Such polishes have excellent spreading, leveling, gloss, and water spot resistance, and have a high degree of water resistance coupled with unusual ease of removal of the dried film.

The resulting polishes of our invention will deposit on various surfaces, substantially impervious thin films which are highly water resistant and yet exhibit excellent "removability" when it is desired to clean the floor or other surface preparatory to applying a fresh polish film. Polishes designed for household use usually should be more easily removed than polishes applied and removed by machinery on floors or surfaces of institutions such as hospitals, offices etc. For determining the ease of removability, a so-called "wet-traffic" test may be used employing the Standard Gardner Straight Line Washability machine which involves applying the finished polish to a surface, drying, and placing the test film under a mechanically oscillating brush in contact with water and noting the number of oscillations required to produce the first whitening of the film. Polishes designed for institutional use may acceptably withstand up to about 500 cycles in the above test, before whitening, using water without soap, i.e. before starting to disintegrate. For household use, films should preferably begin to disintegrate after not more than about 200 cycles of the soapless wet traffic test carried out after the film has dried a month, preferably after not more than 100 cycles. Good institutional polishes will usually withstand at least about 200 cycles before failing. For both household and institutional polishes rapid development of water resistance is extremely desirable. In general polishes that develop a water resistance so as to withstand 5 cycles or more in the soapless wet traffic test after drying for a single day are suitable in this respect.

Water spotting is tested by exposing a film of the polish (after drying for the desired time) to a 1 cc. drop of distilled water for 1 hour and observing the effect on the film. Resistance to water spotting is considered "Excellent" if there is no noticeable effect on the film; "Very good" if only a faint spot appears; "Good" if a spot appears but there is no separation or removal of the film; and "Fair" if the test results in partial film separation or removal. Ratings as low as "Fair" are acceptable in household polishes, while ratings of good to excellent are usually required in institutional maintenance polishes.

The following specific examples further illustrate our invention. Parts are by weight except as otherwise noted.

EXAMPLES 1-7

A series of seven aqueous emulsion floor polish compositions was prepared each containing a blend of oxidized polyethylene wax emulsion, polystyrene emulsion and alkali-soluble resin solution. In successive members of the series the oxidized polyethylene wax emulsion portion was varied by using triethanolamine, first, as the sole amine component of the emulsifying agent, and then in decreasing quantities, with morpholine as the balance of the amine content.

The series included compositions in which triethanolamine was used as 100%; 88%; 77%; 67%; 46%; 27% and zero percent of the total amine content, the balance being morpholine. The total amine content (not including $NH_3$ in resin solution) in the finished polish was about 0.6%.

OXIDIZED POLYETHYLENE WAX EMULSIONS

| Example No. | 1 | 2 | 3 | 4 | 5 | 6 | 7 |
|---|---|---|---|---|---|---|---|
| Oxidized Polyethylene wax | 40 | 40 | 40 | 40 | 40 | 40 | 40 |
| Oleic acid | 7.0 | 6.9 | 6.78 | 6.67 | 6.47 | 6.27 | 6 |
| Triethanolamine | 7.0 | 6.19 | 5.42 | 4.67 | 3.22 | 1.86 | 0 |
| Morpholine | 0 | 0.81 | 1.58 | 2.33 | 3.78 | 5.14 | 7.0 |
| Water to 15% total solids. | | | | | | | |
| Total amine | 7.0 | 7.0 | 7.0 | 7.0 | 7.0 | 7.0 | 7.0 |

POLYSTYRENE EMULSION

| | Parts (wt.) | Percent |
|---|---|---|
| Polystyrene emulsion (40% solids) | 100.0 | 33.0 |
| Dibutyl phthalate | 3.0 | 1.0 |
| Tributoxy ethyl phosphate (KP-140) | 2.4 | 0.8 |
| Water | 197.6 | 65.2 |
| | 303.0 | 100.0 |

RESIN SOLUTION

| | Parts (wt.) | Percent |
|---|---|---|
| Phenol-formaldehyde resin | 30 | 15.0 |
| Ammonium hydroxide (28% $NH_3$) | 5 | 2.5 |
| Water | 165 | 82.5 |
| | 200 | 100.0 |

The oxidized polyethylene wax used was a polyethylene/isopropanol telomer wax having an average molecular weight of about 1500, oxygen content of about 3%, melting point 213–221° F. (ca. 100–105° C.) penetration (100 g., 5 sec., 77° F.) of 3–6, acid number of about 14–17, a zero ester number and toughness (ASTM-256-47-T) of about 3 ft. lbs./in.

The polystyrene emulsion was prepared by blending a commercial polystyrene latex (Ubatol 2003) in which the polystyrene has a molecular weight above 150,000, and containing 40% solids at room temperature, with the dibutyl phthalate and tributoxy ethyl phosphate. After stirring for about ½ hour to insure thorough mixing, water was added with stirring.

The alkali-soluble resin solution was prepared by dissolving the alkali-soluble phenol-formaldehyde coating resin ("Durez 15546 Resin") having an acid number of 130±7 in aqueous ammonium hydroxide solution by heating the water to 85° C., adding about half of the 28% ammonium hydroxide, then adding resin with good agitation while maintaining the temperature at 85°–88° C., then adding the remainder of the 28% ammonium hydroxide and stirring until the resin has dissolved.

Equal proportions by volume of the above oxidized polyethylene wax emulsions were blended with equal proportions of polystyrene resin emulsion and alkali-soluble resin solution to form the polish compositions. The finished polishes were then applied as thin films (about .001″ in thickness) to rubber tiles and films of each composition were subjected to "wet traffic" tests using the standard Gardner test without soap, to determine their "removability" and water resistance characteristics, with the results shown in Table I below.

Table I

WET TRAFFIC TESTS ON COMPOSITIONS CONTAINING VARYING PROPORTIONS OF TRIETHANOLAMINE WITH MORPHOLINE

| Example No. | Percent TEA | Percent MOR | Cycles to First Film Whitening after Drying Time, Days | | | |
|---|---|---|---|---|---|---|
| | | | 1 | 3 | 7 | 31 |
| 1 | 100 | 0 | <3 | 3 | 6 | 30 |
| 2 | 88 | 12 | <3 | 3 | 7 | 35 |
| 3 | 77 | 23 | <3 | 3 | 8 | 45 |
| 4 | 67 | 33 | 5 | 30 | 35 | 90 |
| 5 | 46 | 54 | 10 | 65 | 65 | >500 |
| 6 | 27 | 73 | 35 | 65 | 200 | >500 |
| 7 | 0 | 100 | 90 | 500 | >500 | >500 |

It will be noted that Example 4, containing 67% triethanolamine, exhibits excellent development of water resistance after a single day's drying, i.e. so as to withstand at least 5 cycles in the wet traffic test, and yet is "readily removable" after maximum development of water resistance, i.e. it begins to disintegrate after only 90 cycles in the wet traffic test. This example would meet the requirements for household use. Examples 1-3, having larger proportions of triethanolamine, are unsuitable in that they fail to develop sufficient water resistance after a day's drying time. Examples 5, 6 and 7 are unsuitable in that their "removability" is too poor, requiring over 500 cycles in the test to affect the film.

When a soap solution is used in the test, quicker removal is obtained, i.e. the films withstand fewer cycles in the test.

Results of water spotting tests carried out on all the above films, resulted in ratings of "Excellent," i.e. no visible effect on the films, in all cases after drying times of 7 days, and ratings of "Very good" to "Excellent" at the earlier stages, i.e. producing only a very faint spot.

EXAMPLE 8-13

A series of tests was run in a manner similar to those described in Examples 1-7 above, using the same polish composition except that methoxypropylamine was used as the volatile amine constituent of the amine mixture. Use of methoxypropylamine, a relatively more powerful emulsifying agent than morpholine, permitted reduction in the total amine content and corresponding reduction in oleic acid required, as the proportion of methoxypropylamine increased. Thus the compositions of the oxidized polyethylene wax emulsions used in preparing the wax/polystyrene/resin emulsion compositions in Examples 8-13 are as shown below.

Table II
OXIDIZED POLYETHYLENE WAX EMULSION
[Parts by weight]

| Example No. | 8 | 9 | 10 | 11 | 12 | 13 |
|---|---|---|---|---|---|---|
| Oxidized polyethylene wax | 40 | 40 | 40 | 40 | 40 | 40 |
| Oleic acid | 6.66 | 6.30 | 5.97 | 5.32 | 4.81 | 4 |
| Triethanolamine | 6.17 | 5.37 | 4.59 | 3.13 | 1.83 | 0 |
| Methoxypropylamine | 0.49 | 0.93 | 1.38 | 2.19 | 2.98 | 4 |
| Water to 15% total solids. | | | | | | |
| Total amine | 6.66 | 6.30 | 5.97 | 5.32 | 4.81 | |

Results of wet traffic tests shown in Table III below were obtained.

Table III
WET TRAFFIC TESTS ON COMPOSITIONS CONTAINING VARYING PROPORTIONS OF TRIETHANOLAMINE WITH METHOXYPROPYLAMINE

| Example No. | Percent TEA | Percent MPA | Cycles to First Film Whitening after Drying Time, Days | | | |
|---|---|---|---|---|---|---|
| | | | 1 | 3 | 7 | 31 |
| 8 | 93 | 7 | 3 | 7 | 25 | 160 |
| 9 | 85 | 15 | 4 | 8 | 25 | 160 |
| 10 | 77 | 23 | 3 | 20 | 50 | 230 |
| 11 | 59 | 41 | 7 | 25 | 55 | 490 |
| 12 | 38 | 62 | 43 | 180 | >500 | >500 |
| 13 | 0 | 100 | 53 | over 500 | >500 | >500 |

It will be noted that Example 11, containing 59% of triethanolamine exhibits excellent development of water resistance after a single day's drying, so as to withstand 7 cycles in the wet traffic test, and yet is readily "removable" after a month's drying, i.e. it begins to disintegrate after less than 500 cycles in the wet traffic test. This example would meet the requirements for institutional use. Examples 8 to 10 inclusive having larger proportions of triethanolamine are unsuitable in that they fail to develop sufficient water resistance after a day's drying time. Examples 12 and 13 are unsuitable in that their "removability" is too poor, requiring over 500 cycles in the test to affect the film.

Water spotting tests carried out on the above films showed ratings after 1 day of only "Good" (i.e. showing appearance of a spot but no removal or separation of film), down to proportions of 77% triethanolamine, "Very good" at lower concenrtations. All having 77% or less of TEA showed "Excellent" results at drying times of three days or more.

While the above describes the preferred embodiments of our invention, it will be understood that departures may be made therefrom within the scope of the specification and claims.

We claim:

1. A wax polish in the form of a stable aqueous dispersion containing from about 8 to about 20 parts total solids per 100 parts by weight of dispersion, said total solids comprising essentially (1) 1.6 to 11.0 parts by weight of a wax consisting preponderantly of an emulsifiable oxidized polyethylene wax characterized by an essentially polyethylenic structure formed of recurring —$CH_2$— groups, and having an average molecular weight between about 1,000 and about 3,000 and containing between about 3% and about 6% of oxygen and said oxidized polyethylene wax being emulsified by the presence of an organic amine/higher fatty acid emulsifying agent, the balance selected from a member of the group consisting of carnauba wax and microcrystalline waxes, (2) 1.6 to 11.0 parts by weight of a polymer selected from the group consisting of a polystyrene resin having a molecular weight above 5,000, and (3) 1.6 to 9.0 parts by weight of an alkali-soluble resin selected from the group consisting of rosin, shellac, casein, phenol-formaldehyde resins; condensation products or reactants consisting of maleic anhydride and rosin; condensation products of reactants consisting of fumaric acid and rosin; said amine/fatty acid emulsifying agent being essentially the sole emulsifying agent and being the reaction product of at least one higher fatty acid with a mixture of amines consisting of between about 60% and about 70% triethanolamine, and between about 30% and about 40% of at least one volatile amine selected from the group consisting of morpholine and methoxypropylamine.

2. The polish according to claim 1 wherein the amine used in emulsifying the oxidized polyethylene wax is a mixture of amines consisting of about 70% triethanolamine and about 30% of morpholine, said polish being adapted for household use, and having removability characteristics when applied in the form of a film to a substantially impervious surface, so as to withstand without whitening at least about 5 complete oscillations of a mechanically oscillating brush in the presence of water according to the Gardner wet traffic test after drying for one day and of not more than about 200 cycles after drying for one month.

3. The polish according to claim 1, wherein the amine used in emulsifying the oxidized polyethylene wax is a mixture of amines consisting of between about 60% and about 70% of triethanolamine and between about 40% and about 30% of methoxypropylamine, said polish being adapted for institutional use and having removability characteristics when applied in the form of a film to a substantially impervious surface, so as to withstand without whitening at least about 5 complete oscillations of a mechanically oscillating brush in the presence of water according to the Gardner wet traffic test after drying for one day and of not more than about 500 cycles after drying for one month.

4. The process for preparing an aqueous wax emulsion polish which, when applied in a thin film on a substantially impervious surface will develop a water resistance sufficient to withstand without whitening at least about 5 complete oscillations of a mechanically oscillating brush in the presence of water in the standard Gardner wet traffic test in a drying period of one day, and equivalent to not more than 500 cycles in such test after a drying period of one month, which comprises preparing an aqueous wax emulsion consisting preponderantly of an oxidized polyethylene wax characterized by an essentially polyethylenic structure formed of recurring —$CH_2$— groups, having a molecular weight between about 1,000 and about 3,000 and oxygen content between about 3% and about 6%, the balance selected from a member of the group consisting of carnauba wax and microcrystalline waxes, by melting said wax, and adding thereto between about 28 parts and about 17 parts per 100 parts of wax of a mixture of about equal parts of a higher fatty acid having from 12 to 18 carbon atoms, and a mixture of amines consisting of between about 60% and about 70% of triethanolamine, the balance of the amine being a volatile amine selected from the group consisting of morpholine and methoxypropylamine; emulsifying said mixture in water, to form an emulsion containing about 15% total solids; mixing said wax emulsion in about equal proportions by volume with a polystyrene emulsion containing about 15% polystyrene solids, and an alkali-soluble resin solution containing about 15% resin solids selected from the group consisting of rosin, shellac, casein, phenol-formaldehyde resins; condensation products of reactants consisting of maleic anhydride and rosin; and condensation products of reactants consisting of fumaric acid and rosin.

References Cited in the file of this patent

UNITED STATES PATENTS

| | | |
|---|---|---|
| 2,274,509 | Thompson | Feb. 24, 1942 |
| 2,275,659 | Steinle et al. | Mar. 10, 1942 |
| 2,349,326 | Wilson | Mar. 23, 1944 |
| 2,395,025 | Wassell | Feb. 19, 1946 |
| 2,409,683 | Howk et al. | Oct. 22, 1946 |
| 2,598,666 | Sesso et al. | June 3, 1952 |
| 2,695,277 | Pabst et al. | Nov. 23, 1954 |
| 2,766,214 | Erchak et al. | Oct. 9, 1956 |
| 2,839,482 | Geen et al. | June 17, 1958 |
| 2,874,137 | Pisanchyn et al. | Feb. 17, 1959 |
| 2,908,578 | Barker | Oct. 13, 1959 |

OTHER REFERENCES

Warth: The Chem. and Tech. of Waxes, 2nd Ed., pages 708–726, Reinhold (1956).

Schwartz et al.: Surface Active Agents and Detergents, vol. II, page 736, Interscience Pub., 1958.

Perry et al.: Soap and Chem. Spec., pages 145–7, 167, vol. 30, September 1954.

UNITED STATES PATENT OFFICE
CERTIFICATION OF CORRECTION

Patent No. 2,964,487 December 13, 1960

Wilbur F. Chapman et al.

It is hereby certified that error appears in the above numbered patent requiring correction and that the said Letters Patent should read as corrected below.

Column 8, line 30, for "condensation products or" read -- condensation products of --.

Signed and sealed this 23rd day of May 1961.

(SEAL)
Attest:

ERNEST W. SWIDER
Attesting Officer

DAVID L. LADD
Commissioner of Patents